(12) United States Patent
Rose et al.

(10) Patent No.: US 9,075,151 B2
(45) Date of Patent: Jul. 7, 2015

(54) DETECTOR ARRAY AND METHOD OF MANUFACTURING THE SAME

(75) Inventors: Timothy Patrick Rose, Peaukee, WI (US); David McDaniel, Dousman, WI (US); Leonid Romanov, Waukesha, WI (US)

(73) Assignee: General Electric Company, Schenectady, NY (US)

( * ) Notice: Subject to any disclaimer, the term of this patent is extended or adjusted under 35 U.S.C. 154(b) by 209 days.

(21) Appl. No.: 13/335,285

(22) Filed: Dec. 22, 2011

(65) Prior Publication Data

US 2013/0161521 A1 Jun. 27, 2013

(51) Int. Cl.
*G01T 1/20* (2006.01)
*G01T 1/202* (2006.01)
(52) U.S. Cl.
CPC .............. *G01T 1/202* (2013.01); *Y10T 29/49* (2015.01); *G01T 1/2018* (2013.01)
(58) Field of Classification Search
CPC ......... G01T 1/2006; G01T 1/202; G01T 1/20; G01T 1/2002; G02B 6/10
USPC ....................................................... 250/366
See application file for complete search history.

(56) References Cited

U.S. PATENT DOCUMENTS

| | | | |
|---|---|---|---|
| 4,733,083 A | 3/1988 | Wong | |
| 4,743,764 A | 5/1988 | Casey et al. | |
| 4,749,863 A | 6/1988 | Casey et al. | |
| 4,831,263 A * | 5/1989 | Yamashita | 250/368 |
| 5,012,103 A | 4/1991 | Tanaka et al. | |
| 5,227,634 A | 7/1993 | Ryuo et al. | |
| 6,087,663 A | 7/2000 | Moisan et al. | |
| 6,362,479 B1 | 3/2002 | Andreaco et al. | |
| 6,462,341 B1 * | 10/2002 | Muehllehner | 250/363.03 |
| 6,881,960 B2 * | 4/2005 | Schreiner et al. | 250/368 |
| 7,019,298 B2 | 3/2006 | Tonami et al. | |
| 7,088,901 B2 | 8/2006 | Kim et al. | |
| 7,164,136 B2 | 1/2007 | Aykac et al. | |

(Continued)

FOREIGN PATENT DOCUMENTS

GB 2204769 A 11/1988

OTHER PUBLICATIONS

Search Report and Written Opinion from PCT Application PCT/US2012/066172 dated May 23, 2013.

(Continued)

*Primary Examiner* — Marcus Taningco
(74) *Attorney, Agent, or Firm* — Dean D. Small; The Small Patent Law Group, LLC (57) ABSTRACT

A detector unit for a detector array includes a photo sensor array, a light guide, and a plurality of scintillator elements formed unitarily with the light guide, the scintillator elements configured to emit absorbed energy in the form of light, the light guide being configured to transmit the light received from at least one of the scintillator elements to a photo sensor, the light guide and the plurality of scintillators being formed from the same material, an area covered by the photo sensors being smaller than an area covered by the scintillator elements and a number of photo sensors being less than a number of scintillator elements. A detector array and a method of manufacturing a detector array are also described herein.

24 Claims, 9 Drawing Sheets

(56) References Cited

U.S. PATENT DOCUMENTS

| | | | |
|---|---|---|---|
| 7,652,261 B1* | 1/2010 | Wilson et al. | 250/370.11 |
| 2004/0159792 A1* | 8/2004 | Andreaco et al. | 250/363.03 |
| 2007/0272874 A1 | 11/2007 | Grodzins | |
| 2009/0181491 A1* | 7/2009 | Roizin et al. | 438/72 |

OTHER PUBLICATIONS

Design and Performance of a New Pixelated-LSO/PSPMT Gamma-Ray Detector for High Resolution PET Imaging; Robert A. Mintzer, Member, IEEE, and Stefan B. Siegel, Member, IEEE, Oct. 26, 2007.

* cited by examiner

DETECTOR ARRAY AND METHOD OF MANUFACTURING THE SAME

BACKGROUND OF THE INVENTION

The subject matter disclosed herein relates generally to imaging systems, and more particularly, to a medical imaging system detector array and a method of manufacturing an imaging system detector array.

Detectors for diagnostic imaging systems, for example, a detector for a positron emission tomography (PET) imaging system, typically include a plurality of detector modules that are arranged in a ring. Each detector module includes an array of detector units. Each detector unit may include a plurality of detector scintillator elements that are configured to emit absorbed energy in the form of light. The scintillator elements transmit the light, via a light guide, to an array of light sensors that convert the light from the scintillators into an electric signal that is used to reconstruct an image of an object being scanned.

In at least one conventional detector array, the scintillator elements and the light guide are fabricated from different materials. Moreover, the scintillator elements and the light guide are fabricated as individual components that are coupled together using an adhesive. The light sensors are then coupled to the light guide using an adhesive to form a single detector unit.

The detector unit is typically designed to control the transport of the photons generated in a scintillator element of the scintillator array to each sensor in the sensor array. If the photon transport for every scintillator element in the detector unit is adjusted such that it produces a unique intensity pattern on the sensor array, the number of scintillator elements that a detector unit can process can be larger than the number of light sensors in the detector unit. To facilitate controlling the photon transport from the scintillator elements to the sensor array, the light guide may be constructed of several segments with a reflective optical barrier between the segments. However, because the scintillators and the light guide are fabricated using different materials, the refractive index of the scintillators may be different than the refractive index of the light guide. Moreover, the refractive index of the adhesive bonding the light guide to the scintillator elements and the light sensors may be different than the refractive indexes of the scintillator, the light sensor, or the light guide. As a result, these detector units may have a refractive index mismatch between the scintillators, the light guide, the light sensor, and/or the adhesive. The refractive index mismatch may result in a reduction in the intensity of the light signal transmitted from the scintillators to the light sensor. Moreover, because numerous individual scintillator elements are bonded to a single light guide, it is often difficult to properly align the scintillators with the light guide. As a result, specialized alignment devices are utilized to properly align and bond the scintillators to the light guide.

BRIEF DESCRIPTION OF THE INVENTION

In one embodiment, a detector unit for a detector array is provided. The detector unit includes a photo sensor array, a light guide, and a plurality of scintillator elements formed unitarily with the light guide, the scintillator elements configured to emit absorbed energy in the form of light, the light guide being configured to transmit the light received from at least one of the scintillator elements to a photo sensor, the light guide and the plurality of scintillators being formed from the same material, an area covered by the photo sensors being smaller than an area covered by the scintillator elements and a number of photo sensors being less than a number of scintillator elements In another embodiment, a detector array for an imaging system is provided. The detector array includes a plurality of detector modules. At one of the detector modules includes a plurality of detector units. At least one of the detector units includes a light guide and a plurality of scintillator elements formed unitarily with the light guide.

In a further embodiment, a method of manufacturing a detector array is provided. The method includes receiving a plurality of work pieces and machining the plurality of work pieces to form a plurality of detector units that each include a light guide and a plurality of scintillator elements formed unitarily with the light guide.

In a still further embodiment, another method of manufacturing a detector array is provided. The method includes receiving a plurality of work pieces and machining the plurality of work pieces to form a plurality of detector units that each include a plurality of light guides and a plurality of scintillator elements attached to each light guide, the scintillator elements being formed unitarily with the light guide.

DETAILED DESCRIPTION OF THE INVENTION

The foregoing summary, as well as the following detailed description of certain embodiments, will be better understood when read in conjunction with the appended drawings. To the extent that the figures illustrate diagrams of the functional modules of various embodiments, the functional blocks are not necessarily indicative of the division between hardware circuitry. Thus, for example, one or more of the functional blocks (e.g., processors or memories) may be implemented in a single piece of hardware (e.g., a general purpose signal processor or a block of random access memory, hard disk, or the like). Similarly, the programs may be stand alone programs, may be incorporated as subroutines in an operating system, may be functions in an installed software package, and the like. It should be understood that the various embodiments are not limited to the arrangements and instrumentality shown in the drawings.

As used herein, an element or step recited in the singular and proceeded with the word "a" or "an" should be understood as not excluding plural of said elements or steps, unless such exclusion is explicitly stated. Furthermore, references to "one embodiment" of the present invention are not intended to be interpreted as excluding the existence of additional embodiments that also incorporate the recited features. Moreover, unless explicitly stated to the contrary, embodiments "comprising" or "having" an element or a plurality of elements having a particular property may include additional elements not having that property.

Described herein are exemplary detector arrays that include a plurality of detector units. In various embodiments, each detector unit includes a single light guide and a plurality of scintillators that are formed unitarily with the light guide. Fabricating the scintillators unitarily with the light guide facilitates eliminating a refraction index mismatch between the scintillators and the light guide. Moreover, the scintillators are more precisely positioned with respect to the light guide thus reducing the fabrication time required to align a plurality of conventional scintillators to a conventional light guide.

The various embodiments are described herein as implemented in connection with a positron emission tomography (PET) imaging system. However, it should be appreciated that although the various embodiments are described in connection with a PET imaging system having a particular configuration, the various embodiments may be implemented in connection with PET imaging systems have different configurations and components, as well as with other types of single or dual-modality imaging systems, for example, a single photon emission computed tomography (SPECT) imaging system.

Figure 1:
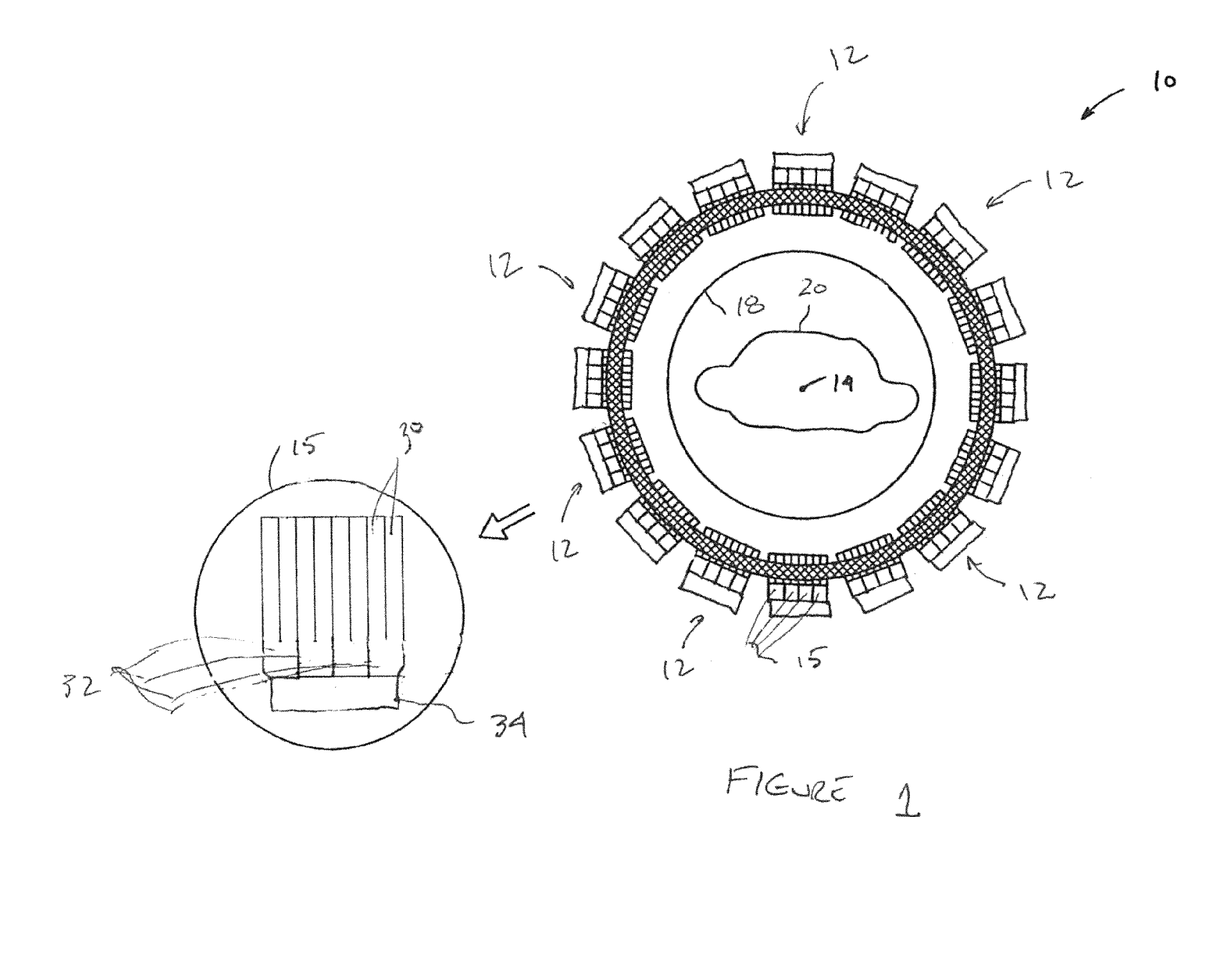
FIG. 1 is a block diagram of an exemplary detector array formed in accordance with various embodiments.

FIG. 1 illustrates a block diagram of an exemplary detector array 10 that is formed in accordance with various embodiments. In the exemplary embodiment, the detector array 10 includes a plurality of detector modules 12, which may be positioned uniformly about a center point 14 to form a detector ring arrangement. The plurality of detector modules 12 may each be spaced apart from one another (as illustrated) or may be positioned substantially adjacent or abutting one another. Each detector module 12 includes one or more detector units 15. A patient bore 18 is provided in which a patient 20 is positioned, and moved axially to perform a PET scan of the patient 20 using any known PET scanning or imaging process. In the exemplary embodiment, each detector unit 15 includes a plurality of scintillator elements 30, a light guide 32 that is formed unitarily or integrally with the plurality of scintillator elements 30, and array of photo sensors 34. The detector module 12 may also include an electronics section 11.

Figure 2:
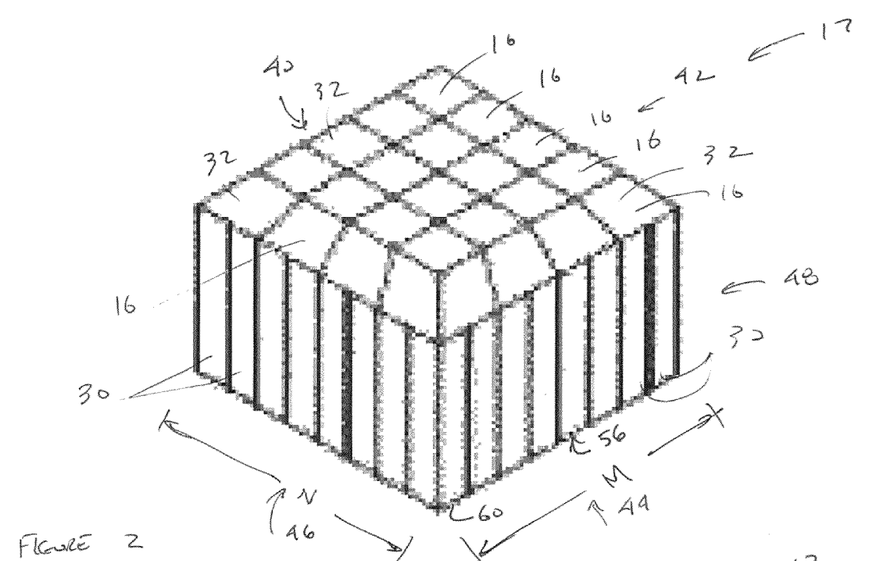
FIG. 2 is a perspective view of an exemplary detector unit formed in accordance with various embodiments
Figure 3:
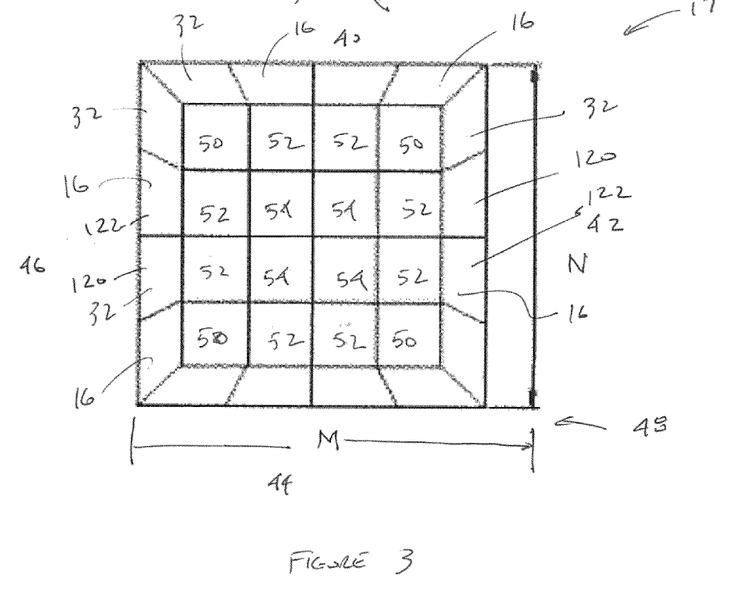
FIG. 3 is a top view of the exemplary detector unit shown in FIG. 2.
Figure 4:
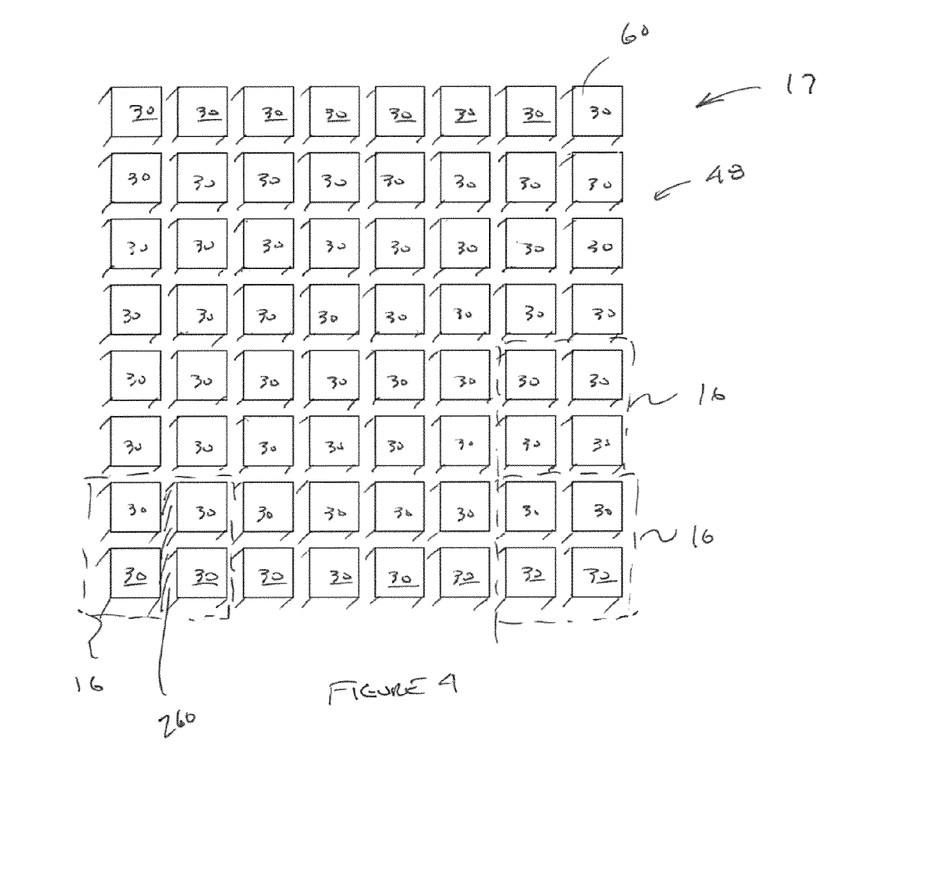
FIG. 4 is a bottom perspective view of the detector unit shown in FIG. 2.

FIG. 2 is top perspective view of a detector unit subassembly 17 that may form a portion of the detector unit 15 shown in FIG. 1. The subassembly 17 includes the scintillators 30 and the light guide 32. FIG. 3 is a top view of the detector unit subassembly 17 shown in FIG. 2. FIG. 4 is a bottom view of the detector unit subassembly 17 shown in FIG. 2. The subassembly 17 includes a first side 40, a second side 42, a third side 44 that is opposite the first side 40, and a fourth side 46 that is opposite to the second side 42. In the exemplary embodiment, each subassembly 17 may be fabricated to include a plurality of detector segments 16 that are arranged in an M×N matrix 48. In some embodiments, M=N. In other embodiments, M≠N. In the exemplary embodiment, M=4 and N=4 such that the subassembly 17 is formed to include a 4×4 matrix of segments 16.

In the exemplary embodiment, the subassembly 17 includes a plurality of corner detector segments 50, a plurality of edge detector segments 52, and a plurality of center detector segments 54. As shown in FIG. 2, the corner detector segments 50 form the corners of the detector unit 15, the plurality of edge detector units 52 form the edges of the detector unit 15, and the plurality of center detector segments 54 form the interior portions of the subassembly 17. In the exemplary embodiment, the subassembly 17 includes four corner detector segments 50 wherein a single corner detector segment is disposed at each corner of the subassembly 17. Moreover, the quantity of edge detector segments 52 and the quantity of center detector segments 54 is based on the size of the matrix 48.

For example, assuming that the subassembly 17 is fabricated as a 6×6 matrix of detector segments 16, the subassembly 17 would include four corner detector segments 50, sixteen edge detector segments 52, and sixteen center detector segments 54. Moreover, assuming that the subassembly 17 is fabricated as an 8×8 matrix of detector segments 16, the subassembly 17 would include four corner detector segments 50, twenty-four edge detector segments 52 and thirty-six center detector segments 54. In the exemplary embodiment, as described herein, the subassembly 17 is fabricated as a 4×4 matrix of detector segments 16, and therefore includes four corner detector segments 50, eight edge detector segments 52, and four center detector segments 54.

As discussed above, each of the detector segments 16 includes a single light guide 32 that is formed unitarily with a plurality of scintillator elements 30. Unitarily and/or integrally, as used herein, means that each detector segment 16 is a single block or piece of material. The block of material is etched, machined, etc., to form both the scintillator elements 30 and the light guide 32. As shown in FIG. 4, in the exemplary embodiment, each detector segment 16 includes four scintillator elements 30. Optionally, each detector segment 16 may include less than four scintillator elements 30 or more than four scintillators elements 30. Referring again to FIG. 2, in operation, annihilation photons from a positron emitting from a region of interest are received at an end 56 of the scintillator element 30. The scintillator element 30, when struck by the incoming photon absorbs the energy of the photon and re-emits the absorbed energy in the form of light. The light is then transmitted from the scintillator element 30 to the light guide 32. The light guide 32 is configured to transport the light received from the scintillator 30 to the light sensor array 34 (shown in FIG. 1). The light sensor array 34 may be embodied as any light sensor, such as for example, a photomultiplier guide or a photodiode.

In the exemplary embodiment, the light guide 32 is formed from a material that enables the light to be substantially internally reflected within the light guide 32 to reduce and/or eliminate any loss of light between the scintillator 30 and the light sensor array 34. Accordingly, the light guide 32 may be fabricated from an optical grade material, such as for example, an acrylic resin, a polycarbonate, an epoxy, and/or a glass material. In the exemplary embodiment, the light guide 32 is fabricated from a bismuth germinate (BGO) material. Because the scintillator elements 30 are formed unitarily with the light guide 32, the scintillator elements 30 are fabricated from the same material as the light guide 32. Accordingly, in the exemplary embodiment, the scintillator elements 30 are also fabricated from the BGO material.

Figure 5:
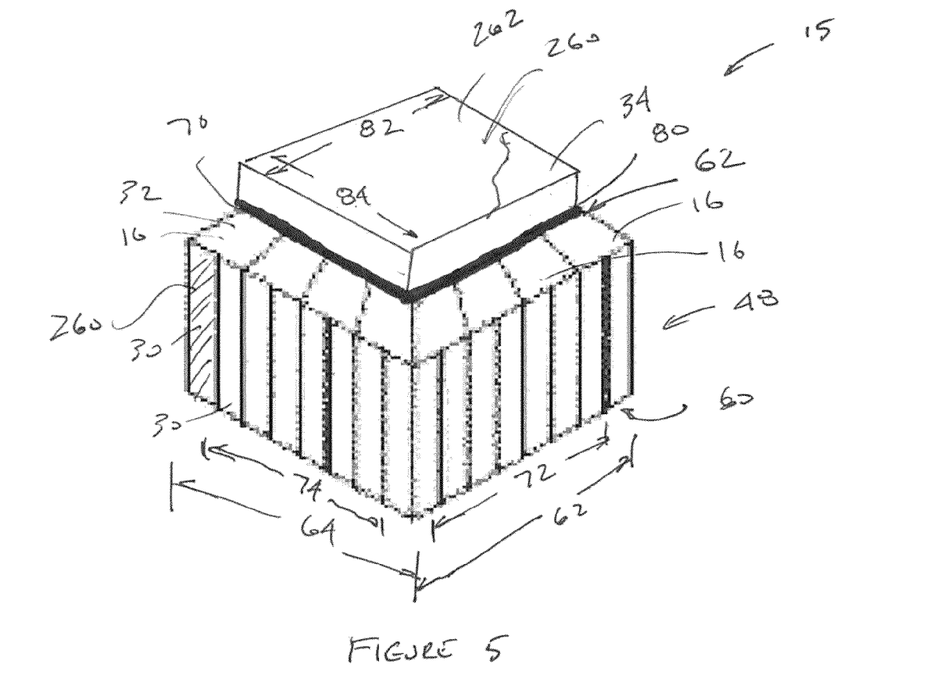
FIG. 5 is another perspective view of an exemplary detector unit formed in accordance with various embodiments showing the photon sensor array

FIG. 5 is a top perspective view of a plurality of detector segments 16 coupled to the light sensor array 34, shown in FIG. 1, to form the detector unit 15. In the exemplary embodiment, the matrix 48 of detector segments 16 includes a matrix input surface 60 that is defined by the plurality of inputs to the scintillator elements 30. The input surface 60 has a length 62 and a width 64. The matrix 48 of detector segments 16 also includes an output surface 70 that is defined by the plurality of outputs from the light guides 32. The matrix output surface 70 has a length 72 and a width 74. In the exemplary embodiment, the area defined by the matrix input surface 60 is larger than the area defined by the matrix output surface 70. The light sensor array 34 also has an input surface 80 that has a length 82 and a width 84. In the exemplary embodiment, an area defined by the electronics section 34 input surface 80 is substantially the same as the area of the matrix output surface 70. Thus, the area defined by the electronics section 34 input surface 80 is smaller than the area defined by the matrix input surface 60. Accordingly, the light guide 32 is fabricated to form a transition between the matrix 48 of scintillators 30 and the electronics section 34 by changing the aspect ratio of the matrix 48 of scintillator elements 30 to be approximately the same as the aspect ratio of the smaller light sensor array 34. Thus, the light guides 32 are tapered or beveled to enable the light to be transmitted from the scintillators 30 to the electronics section 34.

In various embodiments, a portion of the detector unit 15 may be covered by a optical barrier 260. For example, the sides 40, 42, 44, and/or 46 may be covered by the optical barrier 260. Moreover, an upper surface 262 light sensor 34 may be covered by the optical barrier 260. Additionally, as discussed in more detail below, in the exemplary embodiment, a work piece is machined or sawn to form the scintillators 30. Accordingly, in various embodiments, the each scintillator may be separated from an adjacent scintillator by a gap or space. Therefore, in one embodiment, the optical barrier 260 may be disposed within some or all of the gaps such that the optical barrier 260 is disposed between some or all of the scintillators 30. In various embodiments, the optical barrier 260 may be embodied as a diffuse reflector such as for example, a Teflon tape or a spectral reflector.

Figures 6, 8:
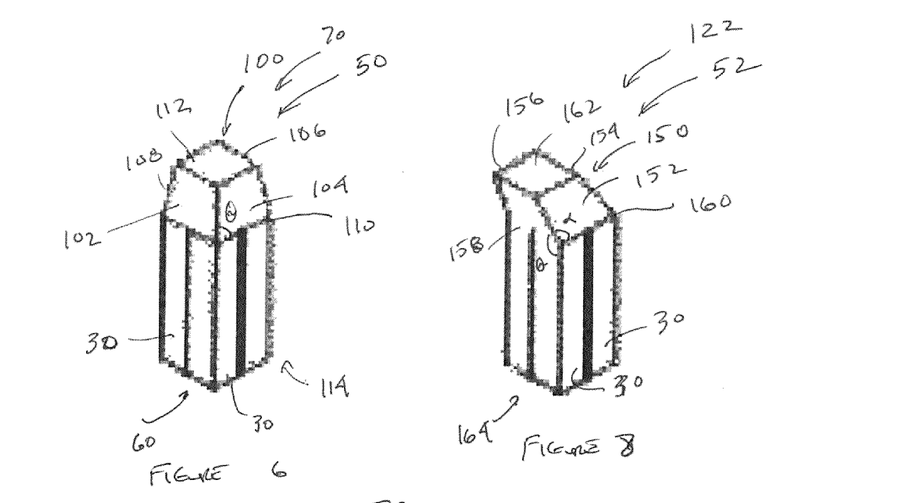
FIG. 6 is another perspective view of an exemplary segment of the detector unit formed in accordance with various embodiments.
FIG. 8 is a perspective view of another exemplary segment of the detector unit formed in accordance with various embodiments.

FIG. 6 is a perspective view of the detector segment 50 that may be used to form a portion of the detector unit 15. As described above, the matrix 48 of detector segments 16 may be formed to include the plurality of corner detector segments 50, the plurality of edge detector segments 52, and the plurality of center detector segments 54. Moreover, each of the detector segments 50, 52, and 54 includes a plurality of scintillator elements 30 and a light guide 32. As a result, the detector segments 50, 52, and 54 may be positioned adjacent to each other to form the matrix 48. In the exemplary embodiment, the corner detector segment 50 includes a light guide 100 having a first side 102, a second side 104, a third side 106, and a fourth side 108. Moreover, the light guide 100 also has an input side 110 and output side 112. As discussed above, when a plurality of detector segments 16 are arranged in the matrix 48, the inputs to the scintillator elements 30 form the matrix input surface 60. Moreover, the outputs from the light guides 32 form the matrix output surface 70. Thus, an input side 114 of the corner detectors segments 50 form a portion of the matrix input surface 60 and the output sides 112 of the light guides 100 forms a portion of the matrix 48 output surface 70.

To form the aspect ratio between the scintillators 30 and the electronics section 34, at least a portion of the light guide 100 is machined or otherwise formed, to include at least one beveled surface to enable the aspect ratio of the corner detector segments 50 to be substantially the same as the aspect ratio of the electronics section 34. In the exemplary embodiment, the first and second sides 102 and 104 of the corner detector segments 50 are machined to form a bevel between the input side 110 of the light guide 100 and the output side 112 of the light guide 100. More specifically, as shown in FIG. 6, the scintillators 30 are formed unitarily with the light guide 100. Accordingly, the scintillators 30 extend to the input side 110 of the light guide 100 and are formed unitarily with the light guide 100.

In the exemplary embodiment, because four corner detector segments 50 are configured to form the four corners of the matrix 48, only two sides of the light guide 100 are beveled. For example, the first side 102 and the second side 104 may be beveled. Optionally, any two adjacent sides of the corner detector segments 50 may be beveled. During fabrication, the two sides of the light guide 100, such as the first side 102 and the second side 104, may be cleaved to form the beveled surfaces. The cleaving may be accomplished utilizing a laser cleaving device (not shown). Optionally, the first side 102 and the second side 104 may be cleaved using any other device suitable for removing a portion of the sidewall surfaces. For example, the first and second sides 102 and 104 may be formed using an etching technique, by grinding and polishing the sides 102 and 104, and/or using a photolithographic technique for the removal of material to the sides 102 and 104. The sides 102 and 104 are formed at an angle θ such that the sidewalls 102 and 104 extend inwardly from the input side 110 of the light guide 100 to the output side 112 of the light guide 100. In the exemplary embodiment, the angle θ is approximately 45 degrees. Optionally, the angle θ may be between 35 degrees and 45 degrees. However, other angles may be provided as desired or needed.

Figures 7, 9:
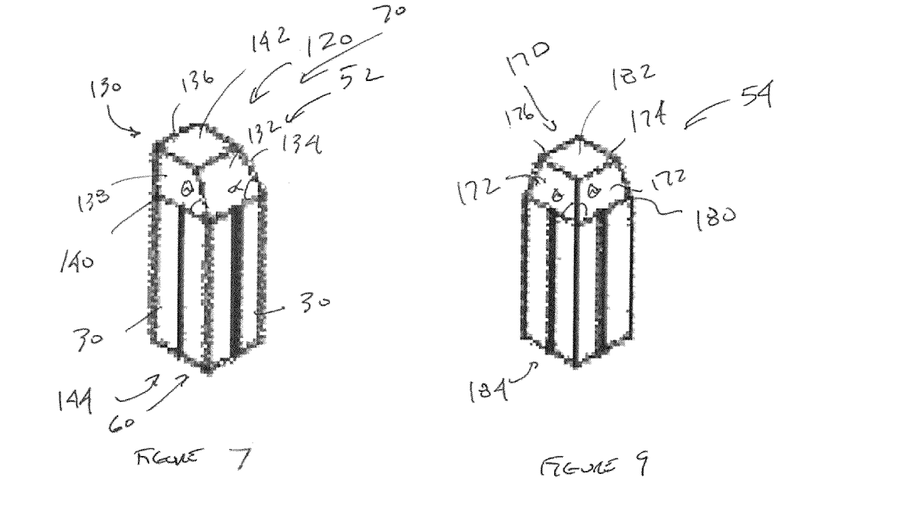
FIG. 7 is a perspective view of another exemplary segment of the detector unit formed in accordance with various embodiments.
FIG. 9 is a perspective view of another exemplary segment of the detector unit formed in accordance with various embodiments.

FIG. 7 is a perspective view of an exemplary edge detector segment 120 that may be used to form a portion of the subassembly 17 described above. FIG. 8 is a perspective view of another exemplary edge detector segment 122 that may be used to form a portion of the subassembly 17 described above. As discussed above, the matrix 48 may be formed to include a plurality of edge detector segments 52 that are arranged between the corner detector segments 50 and therefore form the sides of the matrix 48. In the exemplary embodiment, the edge detector units 52 may include a first edge detector segment 120 and a second edge detector segment 122.

In the exemplary embodiment, the edge detector segments 120 includes a light guide 130 having a first side 132, a second side 134, a third side 136, and a fourth side 138. Moreover, the light guide 130 also has an input side 140 and output side 142. As discussed above, when a plurality of detector segments 16 are arranged in the matrix 48, the inputs to the scintillator elements 30 form the matrix input surface 60. Moreover, the outputs from the light guides 32 form the matrix output surface 70. Thus, an input side 144 of the edge detector segments 120 form a portion of the matrix input surface 60 and the output side 142 of the light guide 130 forms a portion of the matrix 48 output surface 70.

To form the aspect ratio between the scintillators 30 and the electronics section 34, at least a portion of the light guide 130 is machined or otherwise formed, to include at least one beveled surface to enable the aspect ratio of the edge detector segment 120 to be substantially the same as the aspect ratio of the electronics section 34. In the exemplary embodiment, a single side of the light guide 130 is machined to form a beveled surface. For example, in various embodiments, the first side 132 of the light guide 130 is machined to form a bevel between the input side 140 of the light guide 130 and the output side 142 of the light guide 130. More specifically, as shown in FIG. 7, the scintillator elements 30 are formed unitarily with the light guide 130. Accordingly, the scintillator elements 30 extend to the input side 140 of the light guide 130 and are formed unitarily with the light guide 130.

The first side 132 may be beveled using a cleaving operation similar to the cleaving operation used to form the corner detector segments 50 as described above. In the exemplary embodiment, the side 132 is formed at an angle θ such that the sidewall 132 extends inwardly from the input side 140 of the light guide 130 to the output side 142 of the light guide 130. In the exemplary embodiment, the angle θ is approximately 45 degrees. Optionally, the angle θ may be between 35 degrees and 45 degrees, or other angles possible. In the exemplary embodiment, the side 132 of the light guide 130 is cleaved at the same angle as the side 104 of the light guide 100 such that the light guides forming edges of the matrix 48 are all cleaved at the same angle.

In the exemplary embodiment, a second side 134 of the light guide 130 is also cleaved at an angle to enable the edge detector segment 120 to be disposed adjacent to the edge detector segment 122 as shown in FIG. 3. The second side 134 is cleaved at an angle α. The angle α may be selected to be any angle that facilitates improving or optimizing the aspect ratio between the input and output sides 140 and 142 of the light guide 130. In the exemplary embodiment, the matrix 48 is formed to include four edge detector segments 120 as shown in FIG. 3.

Referring to FIG. 8, the edge detector segment 122 includes a light guide 150 having a first side 152, a second side 154, a third side 156, and a fourth side 158. Moreover, the light guide 150 also has an input side 160 and output side 162. An input side 164 of the edge detector segments 122 form a portion of the matrix input surface 60 and the output side 162 of the light guide 150 forms a portion of the matrix 48 output surface 70.

To form the aspect ratio between the scintillator elements 30 and the light sensor array 34, at least a portion of the light guide 150 is machined or otherwise formed, to include at least one beveled surface to enable the aspect ratio of the edge detector segment 122 to be substantially the same as the aspect ratio of the electronics section 34. In the exemplary embodiment, a single side of the light guide 150 is machined to form a beveled surface. For example, in various embodiments, the first 152 of the edge detector segments 122 is machined to form a bevel between the input side 160 of the light guide 150 and the output side 162 of the light guide 150. The first side 152 may be beveled using a cleaving operation similar to the cleaving operation used to form the corner detector segments 50 and 122 as described above. In the exemplary embodiment, the side 152 is formed at an angle θ such that the sidewall 152 extends inwardly from the input side 160 of the light guide 150 to the output side 162 of the light guide 150. In the exemplary embodiment, the angle θ is approximately 45 degrees. Optionally, the angle θ may be between 35 degrees and 45 degrees or other angles possible. In the exemplary embodiment, the side 152 of the light guide 150 is cleaved at the same angle as the side 104 of the light guide 100 such that the light guides forming edges of the matrix 48 are all cleaved at the same angle.

In the exemplary embodiment, a second side 154 of the light guide 150 is also cleaved at an angle to enable the edge detector segment 122 to be disposed adjacent to the edge detector segments 120 as shown in FIG. 3. The second side 154 is cleaved at an angle $\alpha^{-1}$ which is an angle that is complementary to the angle α. In the exemplary embodiment, the matrix 48 is formed to include four edge detector segments 122 as shown in FIG. 3.

FIG. 9 is a perspective view of an exemplary center detector segment 54 that may be used to form a portion of the subassembly 17. As described above, the matrix 48 may be formed to include a plurality of center detector segments 54 that are arranged between an outer edge of the matrix 48 that is defined by the corner detector segments 50 and the edge detector segments 52.

In the exemplary embodiment, each center detector segment 54 includes a light guide 170 having a first side 172, a second side 174, a third side 176, and a fourth side 178. Moreover, the light guide 170 also has an input side 180 and output side 182. As discussed above, when a plurality of detector segments 16 are arranged in the matrix 48, the inputs to the scintillators 30 form the matrix input surface 60. Moreover, the outputs from the light guides 32 form the matrix output surface 70. Thus, an input side 184 of the center detector segments 54 form a portion of the matrix input surface 60 and the output side 182 of the light guide 170 forms a portion of the matrix 48 output surface 70.

To form the aspect ratio between the scintillators 30 and the electronics section 34, at least a portion of the light guide 170 is machined or otherwise formed, to include at least one beveled surface to enable the aspect ratio of the center detector segments 54 to be substantially the same as the aspect ratio of the photon sensor array 34. In various embodiments, at least two sides of the light guide 170 are machined to form beveled surfaces. More specifically, as shown in FIG. 9, the scintillator elements 30 are formed unitarily with the light guide 170. Accordingly, the scintillator elements 30 extend to the input side 180 of the light guide 170 and are formed unitarily with the light guide 170.

In the exemplary embodiment, because the center detector segments 54 are configured to form the center portion of the matrix 48, all four sides of the light guide 170 are beveled. The side 172, 174, 176, and 178 may be beveled using a cleaving operation similar to the cleaving operation used to form the corner detector segments 50 as described above. In the exemplary embodiment, the sides 172, 174, 176, and 178 are formed at an angle θ such that the sidewall 172, 174, 176, and 178 each extend inwardly from the input side 180 of the light guide 170 to the output side 182 of the light guide 170. In the exemplary embodiment, the angle θ is approximately 45 degrees. Optionally, the angle θ may be between 35 degrees and 45 degrees.

Figure 10:
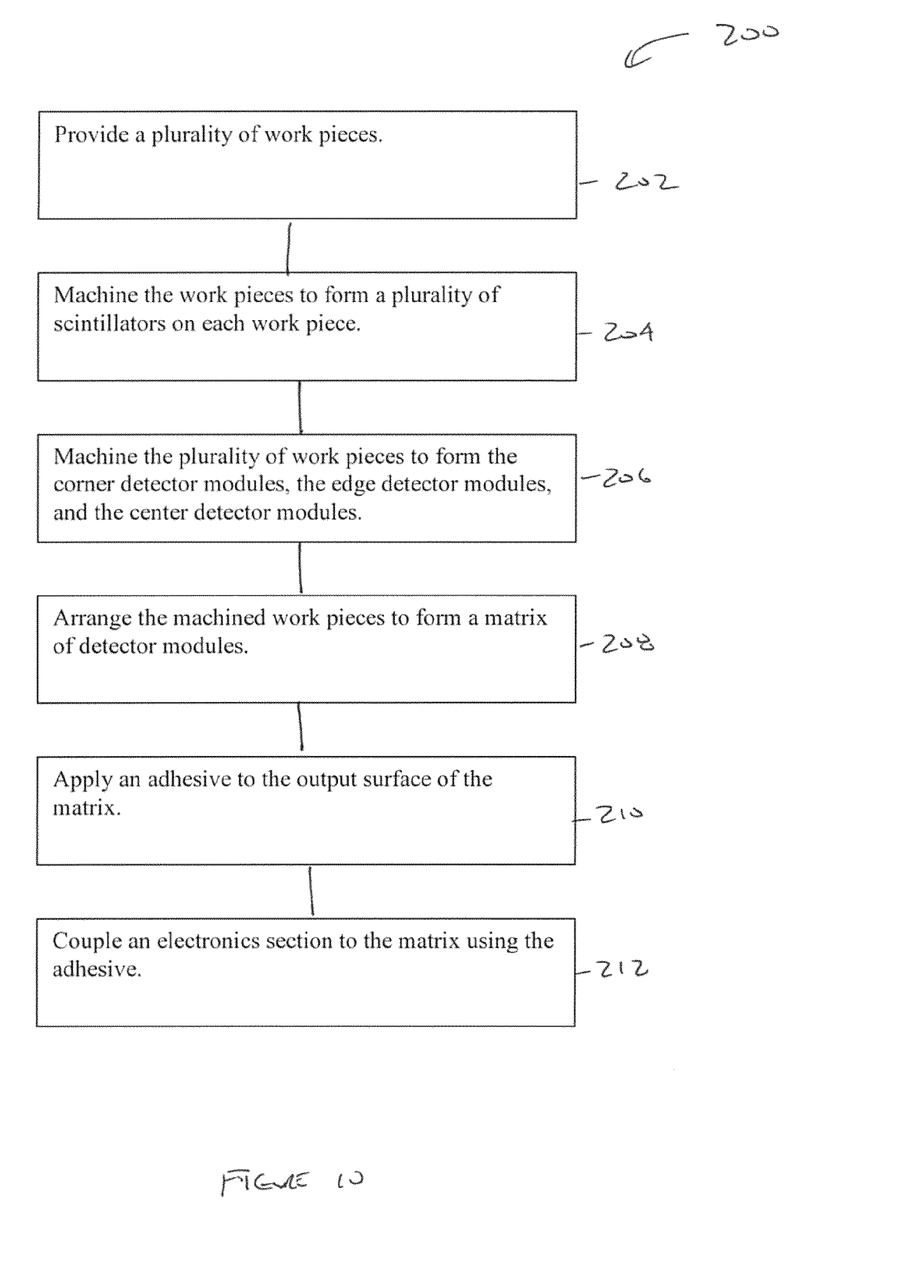
FIG. 10 is a flowchart of a method for fabricating a detector array formed in accordance with various embodiments.

FIG. 10 is a flowchart illustrating an exemplary method 200 of fabricating a detector array, such as the detector array 10 shown in FIG. 1. At step 202, a plurality of work pieces are received. The plurality of work pieces may be of a quantity that correspond to the number of detector segments 16 that are being utilized to form the matrix 48. For example, in the exemplary embodiment, the matrix 48 is a 4×4 matrix that is formed from sixteen detector segments 16. Accordingly, at 202, sixteen work pieces are received. In the exemplary embodiment, the work pieces are formed from a BGO material.

At 204, the work pieces are machined to form the scintillator elements 30. In the exemplary embodiment, each of the detector segments 16 is fabricated to include four scintillator elements 30. To form the four scintillators 30, the work piece may be sawn from an input side of the detector segment, which is also the input to the scintillator element, along a substantially straight line to an imaginary line that forms the input side to the light guide. The work piece may then be rotated ninety degrees and the sawing procedure repeated. It should be realized that by performing two saw cuts, four scintillator elements 30 may be formed. It should further be realized that although the exemplary embodiment describes sawing the work piece to form the scintillator elements 30, other techniques, such as etching may be utilized to form the scintillator elements 30.

At 206, the plurality of work pieces are machined to form the corner detector units 50, the edge detector units 52, and the center detector units 54 having the beveled surfaces as described above. In the exemplary embodiment, four work pieces are machined to form the corner detector segments 50, eight work pieces are machined to form the edge detector segments 52, and four work pieces are machined to form the center detector segments 54.

At 208, the four corner detector segments 50, the eight edge detector segments 52, and the four center detector segments 54 are arranged to form the matrix 48 as shown in FIG. 3.

At 210, an adhesive is applied to the output surface of the matrix 48. As discussed above, once each of the detector segments 16 are arranged in the matrix 48, the output surfaces of the light guides 32 form a single, substantially parallel surface which is configured to receive the adhesive thereon. At 212, the electronics section 34 is coupled to the matrix 48 using the adhesive.

Described herein, in various embodiments, is an exemplary detector array that includes a plurality of detector segments that are arranged as a matrix. A detector electronics section may be coupled directly to the matrix using an adhesive. Moreover, because there is an aspect ratio change between the photo sensor array and the detector segments, the detector segments are beveled to compensate for the aspect ratio change. The beveled surfaces therefore guide the light emitted from the scintillators into the smaller electronics section.

In various embodiments, the scintillator elements are formed integrally with the light guide to facilitate eliminating light loss that may be caused by using two different materials having different indexes of refraction. More specifically, because the light guide is formed integrally with the scintillators using the same material, the scintillators and the light guide have the same refractive index thus reducing light loss between the scintillators and the light guide.

Figure 13:
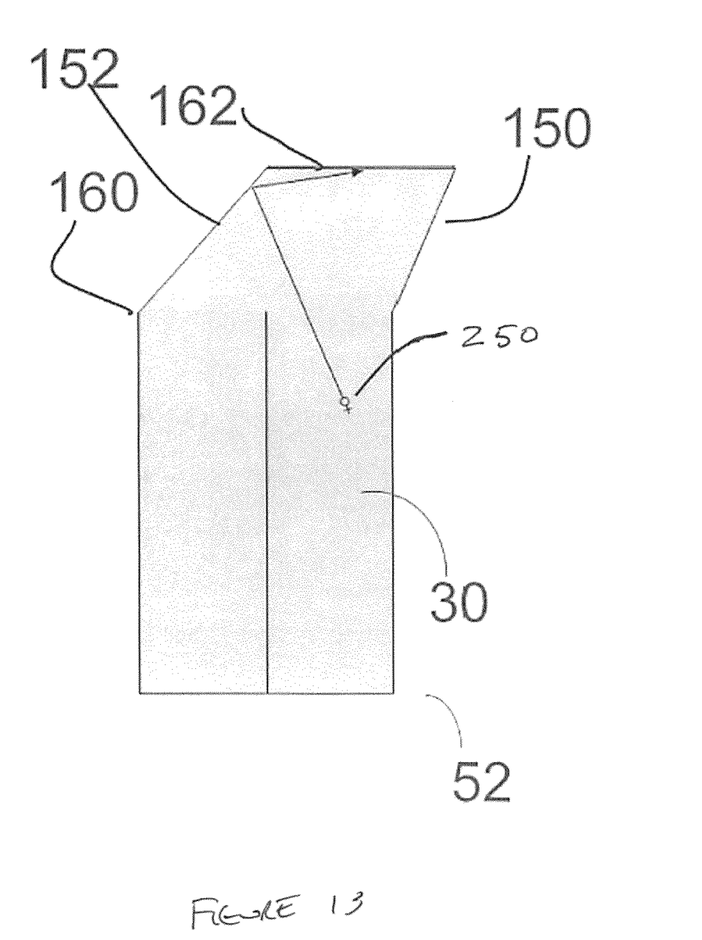
FIG. 13 is a side view of an exemplary detector segment formed in accordance with various embodiments.

For example, FIG. 13 illustrates an additional advantage of forming integrally the light guide and scintillator elements in a detector segment. In operation, scintillators used to detect high energy gamma rays and annihilation photons typically have very high optical indexes. For example BGO has an optical index of greater than 2.1. Materials typical used for construction light guides have a much lower optical index. For example glasses and plastics typical have an optical index between 1.2 and 1.6. Commercial optical epoxies also typically have optical indexes between 1.2 and 1.6.

Accordingly, and referring to FIG. 13, consider a scintillation photon 250 created in a scintillation element 30 and traveling towards the light guide 150 as shown in FIG. 13 wherein the light guide 150 and scintillator elements 30 are made from same material. In operation, the photon's 250 direction is not changed when it crosses the surface 160 and reaches the light sensor. Moreover, the photon 250 does not reflect off the sides of the scintillator elements 30. Since the path travel and the number of reflections of surfaces by the photon 250 in FIG. 13 is relatively larger, the probability of the photon 250 being absorbed is greater than a conventional device wherein the light guide material is different than the material used to fabricate the scintillator elements.

Moreover, fabricating the scintillators integrally with the light guide eliminates a bond layer that may otherwise be utilized to couple the light guide to the scintillator elements. Additionally, forming the light guide integrally with the scintillators reduces the overall assembly time to manufacture the detector array and may therefore facilitate reducing the overall cost of the detector array. In operation, the detector segments are configured to perform at least two functions including scintillation and guiding the light from the scintillator elements to the photo sensor array. The light guides are beveled to enable an aspect ratio of the detector guide matrix to substantially match the aspect ratio of the electronics device.

Various embodiments provide a detector array that may be used with a multi-modality imaging system as described in more detail below. The multi-modality imaging systems may be any type imaging system, for example, different types of medical imaging systems, such as a PET system, a SPECT system, a computed tomography (CT) system, an ultrasound system, a magnetic resonance imaging (MRI) system or any other system capable or generating images. The various embodiments are not limited to multi-modality medical imaging systems, but may be used on a single modality medical imaging system such as a stand-along PET imaging system or a stand-along SPECT imaging system, for example. While, some of the embodiments are described herein with respect to a PET imaging system having a stationary detector, it should be realized that the embodiments described herein may also be used with other types of PET imaging systems. Other types of PET imaging systems may include, for example, a PET imaging system having a non-stationary detector or a Time-of-Flight (TOF) PET imaging system. Moreover, the various embodiments are not limited to medical imaging systems for imaging human subjects, but may include veterinary or non-medical systems for imaging non-human objects etc.

Figure 11:
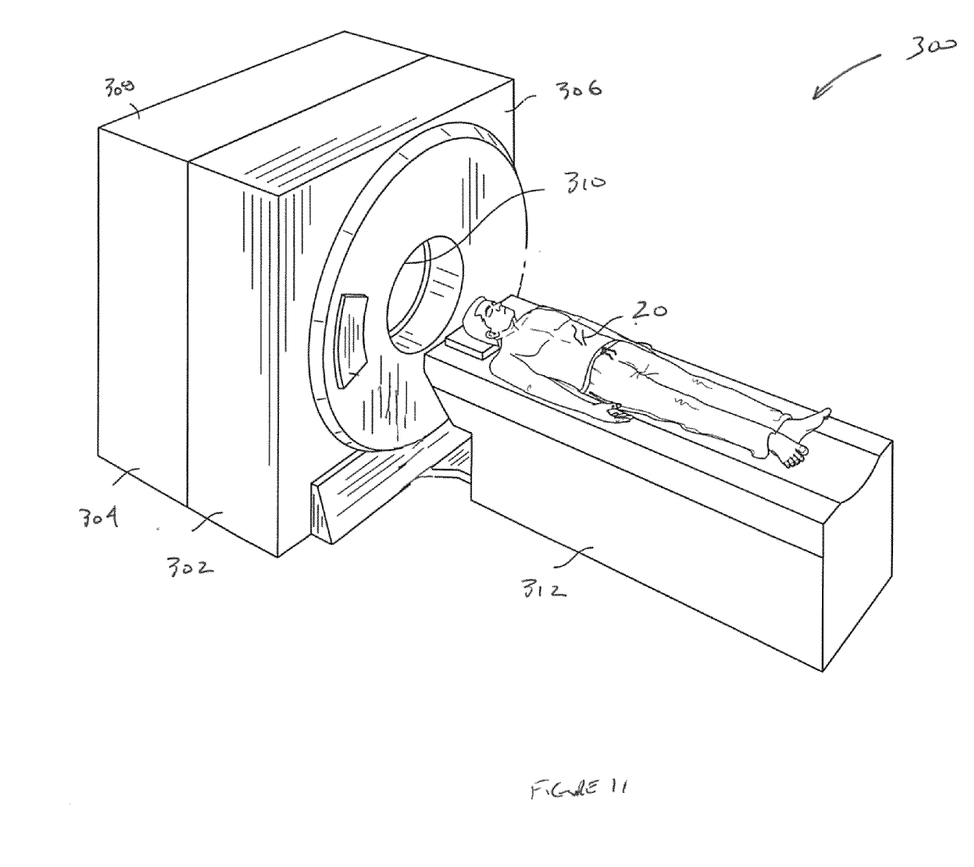
FIG. 11 is a perspective view of an exemplary medical imaging system formed in accordance with various embodiments.

FIG. 11 is a perspective view of an exemplary multi-modality imaging system 300 that includes a first modality unit 302 and a second modality unit 304. The two modality units enable the multi-modality imaging system 300 to scan an object, such as the patient 20 in a first modality using the first modality unit 302 and to scan the patient 20 in a second modality using the second modality unit 304. The multi-modality imaging system 300 allows for multiple scans in different modalities to facilitate an increased diagnostic capability over single modality systems. In one embodiment, multi-modality imaging system 300 is a Computed Tomography/Positron Emission Tomography (CT/PET) imaging system 300, e.g. the first modality 302 is a CT imaging system and the second modality 304 is a PET imaging system. The CT/PET system 300 is shown as including a gantry 306 that is associated with a CT imaging system and a gantry 308 that is associated with a PET imaging system. During operation, the patient 20 is positioned within a central opening 310, defined through the imaging system 300, using, for example, a motorized table 312. The gantry 308 includes a detector array, such as the detector array 10 described above.

Figure 12:
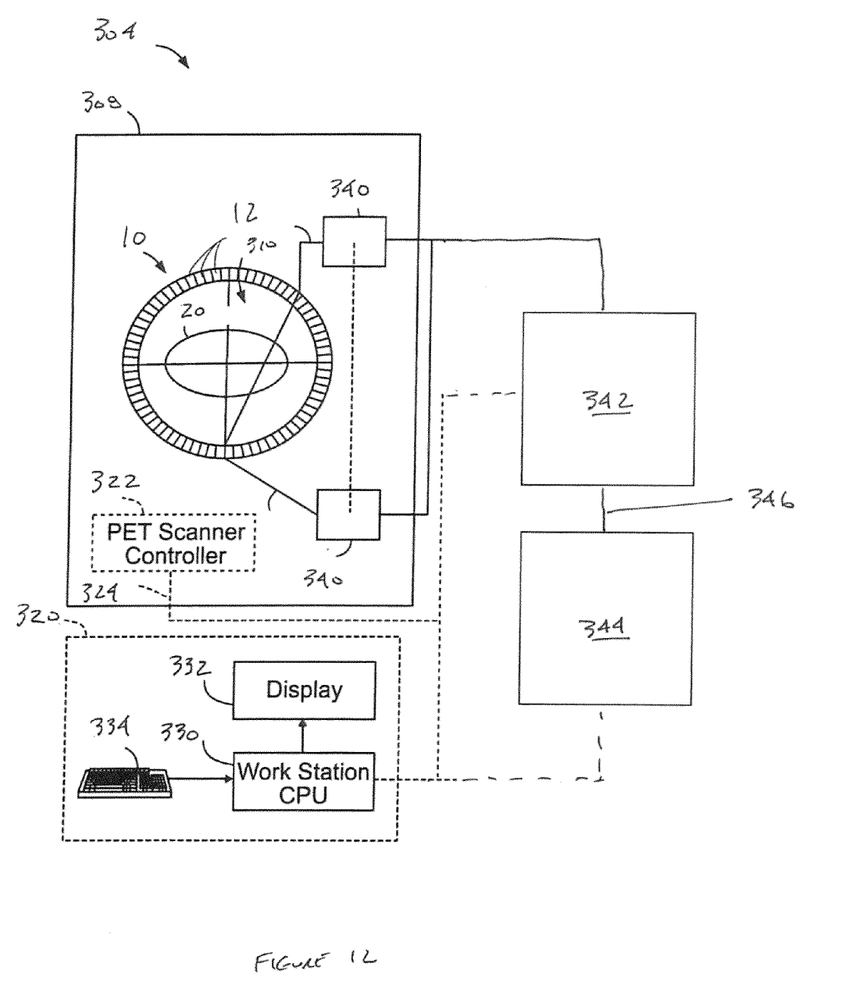
FIG. 12 is a block schematic diagram of one modality unit that forms part of the system illustrated in FIG. 11.

FIG. 12 is a block schematic diagram of the PET imaging system 304 illustrated in FIG. 11 in accordance with various embodiments. The PET imaging system 304 includes a detector array 10 that is arranged as ring assembly of individual detector modules 12. Each detector module 12 may include a plurality of detector units 15 as described above. The detector array 10 also includes the central opening 310, in which an object or patient, such as the patient 20 may be positioned, using, for example, the motorized table 312 (shown in FIG. 11). The motorized table 312 is aligned with the central axis of the detector array 10. During operation, the motorized table 312 moves the patient 20 into the central opening 310 of the detector array 10 in response to one or more commands received from an operator workstation 320. More specifically, a PET scanner controller 322 responds to the commands received from the operator workstation 320 through a communication link 324. Therefore, the scanning operation is controlled from the operator workstation 320 through PET scanner controller 322.

The workstation 320 may be embodied as a personal computer (PC) that is positioned near the PET imaging system 304 and hard-wired to the PET scanner controller 322 via the communication link 324. The workstation 320 may also be embodied as a portable computer such as a laptop computer or a hand-held computer that transmits information to the PET scanner controller 322. In one embodiment, the communication link 324 may be hardwired between the PET scanner controller 322 and the workstation 320. Optionally, the communication link 324 may be a wireless communication link that enables information to be transmitted to or from the workstation to the PET scanner controller 322 wirelessly. In the exemplary embodiment, the workstation 320 controls real-time operation of the PET imaging system 304. The workstation 320 is also programmed to perform medical image diagnostic acquisition and reconstruction processes described herein.

The operator workstation 320 includes a central processing unit (CPU) or computer 330, a display 332 and an input device 334. As used herein, the term "computer" may include any processor-based or microprocessor-based system including systems using microcontrollers, reduced instruction set computers (RISC), application specific integrated circuits (ASICs), field programmable gate array (FPGAs), logic circuits, and any other circuit or processor capable of executing the functions described herein. The above examples are exemplary only, and are thus not intended to limit in any way the definition and/or meaning of the term "computer". In the exemplary embodiment, the computer 330 executes a set of instructions that are stored in one or more storage elements or memories, in order to process input data. The storage elements may also store data or other information as desired or needed. The storage element may be in the form of an information source or a physical memory element within the computer 330.

The CPU 330 connects to the communication link 324 and receives inputs, e.g., user commands, from the input device 334. The input device 334 may be, for example, a keyboard, mouse, a touch-screen panel, and/or a voice recognition system, etc. Through input device 334 and associated control panel switches, the operator can control the operation of the PET imaging system 304 and the positioning of the patient 20 for a scan. Similarly, the operator can control the display of the resulting image on the display 332 and can perform image-enhancement functions using programs executed by the workstation CPU 330.

During operation, when a photon collides with a scintillator on the detector array 10, the photon collision produces a scintilla on the scintillator. The scintillator produces an analog signal that is transmitted to an electronics section, via the light guide, as described above. The electronics section outputs an analog signal to the communication link 324 when a scintillation event occurs. A set of acquisition circuits 340 is provided to receive these analog signals. The acquisition circuits 340 process the analog signals to identify each valid event and provide a set of digital numbers or values indicative of the identified event. For example, this information indicates when the event took place and the position of the scintillation scintillator that detected the event.

The digital signals are transmitted through a communication link, for example, a cable, to a data acquisition controller 342. The data acquisition processor 342 is adapted to perform the scatter correction and/or various other operations based on the received signals. The PET imaging system 304 may also include an image reconstruction processor 344 that is interconnected via a communication link 346 to the data acquisition controller 342. During operation, the image reconstruction processor 344 then performs various image enhancing techniques on the digital signals and generates an image of the patient 20.

The various embodiments and/or components, for example, the monitor or display, or components and controllers therein, also may be implemented as part of one or more computers or processors. The computer or processor may include a computing device, an input device, a display unit and an interface, for example, for accessing the Internet. The computer or processor may include a microprocessor. The microprocessor may be connected to a communication bus. The computer or processor may also include a memory. The memory may include Random Access Memory (RAM) and Read Only Memory (ROM). The computer or processor further may include a storage device, which may be a hard disk drive or a removable storage drive such as a floppy disk drive, optical disk drive, and the like. The storage device may also be other similar means for loading computer programs or other instructions into the computer or processor.

The methods described herein are used to manufacture a detector array. The methods may be embodied as a set of instructions that are stored on a computer and implemented using, for example, the computer 330 shown in FIG. 12, software, hardware, a combination thereof, or a tangible non-transitory computer readable medium.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the invention without departing from its scope. For example, the ordering of steps recited in a method need not be performed in a particular order unless explicitly stated or implicitly required (e.g., one step requires the results or a product of a previous step to be available). Many other embodiments will be apparent to those of skill in the art upon reviewing and understanding the above description. The scope of the invention should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Further, the limitations of the following claims are not written in means-plus-function format and are not intended to be interpreted based on 35 U.S.C. §112, sixth paragraph, unless and until such claim limitations expressly use the phrase "means for" followed by a statement of function void of further structure.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A detector unit for a detector array, said detector unit comprising:
   a photo sensor array;
   a plurality of light guides; and
   a plurality of scintillator elements formed unitarily with the light guides, the scintillator elements configured to emit absorbed energy in the form of light, the light guide being configured to transmit the light received from at least one of the scintillator elements to a corresponding photo sensor in the photo sensor array, the light guide and the plurality of scintillators being formed from the same material, the photo sensor having a sensitivity area that is smaller than an emission area of the scintillator elements and a number of photo sensors being less than a number of scintillator elements, wherein each light guide includes a transmission end located directly adjacent to the photo sensor array, each of the transmission ends have at least one beveled surface that enables the transmission end to align with the sensitivity area of the photo sensor.

2. The detector unit of claim 1, wherein at least three scintillator elements are formed unitarily with the light guide.

3. The detector unit of claim 1, wherein the light guide and the plurality of scintillators are fabricated using a bismuth germinate (BGO) material.

4. The detector unit of claim 1, wherein light guide includes a first surface and an opposing second surface, the first surface having a first surface area correspond to and align with the sensitivity area and the second surface having a second surface area correspond to and align with the emission area, the second surface area being larger than the first surface area.

5. The detector unit of claim 1, wherein the light guides includes a first surface, an opposing second surface, and a plurality of sidewalls between the first and second surfaces, at least two the sidewalls being tapered between the first and second surfaces.

6. A detector array for an imaging system, said detector array comprising:
   a plurality of detector modules, at least one of the detector modules including a plurality of detector units having corresponding center detector segments, at least one of the detector units including:
   a plurality of light guides, wherein at least one of the light guides is formed unitarily with a plurality of scintillator elements to form the center detector segments, the light guide corresponding to the center detector segment having at least one inwardly beveled surface to enable an output surface area to be less than an input surface area, the light guide being configured to transmit the light received from at least one of the scintillator elements to a photo sensor.

7. The detector array of claim 6, wherein the plurality of detector modules are arranged in a ring to form the detector array.

8. The detector array of claim 6, wherein the detector units are arranged in an M×N matrix to form the detector module.

9. The detector array of claim 8, further comprising an electronics section coupled to the M×N matrix.

10. The detector array of claim 6, wherein the light guide and the plurality of scintillator elements are fabricated using a bismuth germinate (BGO) material.

11. The detector array of claim 6, wherein each light guide includes a first surface and an opposing second surface, the first surface having a first surface area and the second surface having a second surface area, the second surface area being larger than the first surface area.

12. The detector array of claim 11, wherein the light guide includes a first surface, an opposing second surface, and a plurality of sidewalls between the first and second surfaces, at least two the sidewalls being tapered between the first and second surfaces.

13. The detector array of claim 11 wherein the light guide includes an optical barrier that is placed between the detector segments.

14. The detector array of claim 13, wherein the optical barrier is a spectral reflector.

15. A method of manufacturing a detector array, said method comprising:
   receiving a plurality of work pieces; and
   machining the plurality of work pieces to form a plurality of detector units that each include a plurality of light guides and a plurality of scintillator elements formed unitarily with each light guide to form a detector segment, the light guide having at least one beveled surface and being configured to transmit the light received from at least one of the scintillator elements to a photo sensor.

16. The method of claim 15, further comprising fabricating the light guide and the plurality of scintillators using a bismuth germinate (BGO) material.

17. The method of claim 15, further comprising coupling a photo sensor array to a surface of the light guide.

18. A method of manufacturing a detector array, said method comprising:
   receiving a plurality of work pieces; and
   machining the plurality of work pieces to form a plurality of detector units having corresponding center detector segments, the detectors units each include a plurality of light guides and a plurality of scintillator elements attached to each light guide, the scintillator elements being formed unitarily with the light guide to form at least one of the center detector segments, each light guide having at least one beveled surface to enable an output surface area to be less than an input surface area and being configured to transmit the light received from at least one of the scintillator elements to a photo sensor.

19. The method of claim 18, further comprising fabricating the light guide and the plurality of scintillators using a bismuth germinate (BGO) material.

20. The method of claim 18, further comprising coupling a photo sensor array to a surface of the plurality of light guides.

21. The method of claim 20, wherein a first surface area of the light guide coupled to the photo sensor array is adjacent to a beveled surface such that the first surface area is less than a second surface area of the light guide attached to the scintillator elements.

22. The method of claim 18, further comprising machining the light guides of a plurality of work pieces to form the detector segments, wherein a number of beveled surfaces of the light guide machined is based on the detector segment formed.

23. A detector array, comprising:
   a photo sensor array having a plurality of photo sensors (PS) with corresponding PS surface areas;
   a matrix of detector segments (DS) each of the DS comprising:
   a light guide (LG) having at least one beveled surface; and
   a plurality of scintillator elements (SE) formed integrally with a corresponding LG, the SE having an input surface with an SE surface area that is configured to absorb incoming photons, the SE re-emitting absorbed energy as light, the LG having an output surface with an LG output surface area, the output surface of the LG configured to transmit light to a corresponding photo sensor, the LG and the plurality of SE being formed from a common material in each of the DS, the PS surface areas and LG output surface areas being smaller than the SE surface area, wherein a number of PS in the photo sensor array is less than the number of SE in the matrix of DS.

24. The detector unit of claim 23, wherein the PS surface areas collectively defining a PS aspect ratio, the SE surface area of the DS collectively defining an SE aspect ratio that is longer than the PS aspect ratio, the LG forming a transition between the matrix of SE to the photo sensor array by changing an aspect ratio of the matrix of SE to be approximately a same as an aspect ratio of the PS array.

\* \* \* \* \*